Aug. 26, 1947.  P. F. ZIEGLER  2,426,257
PRESSURE SENSITIVE ADHESIVE AND ADHESIVE TAPE
Filed Aug. 2, 1940
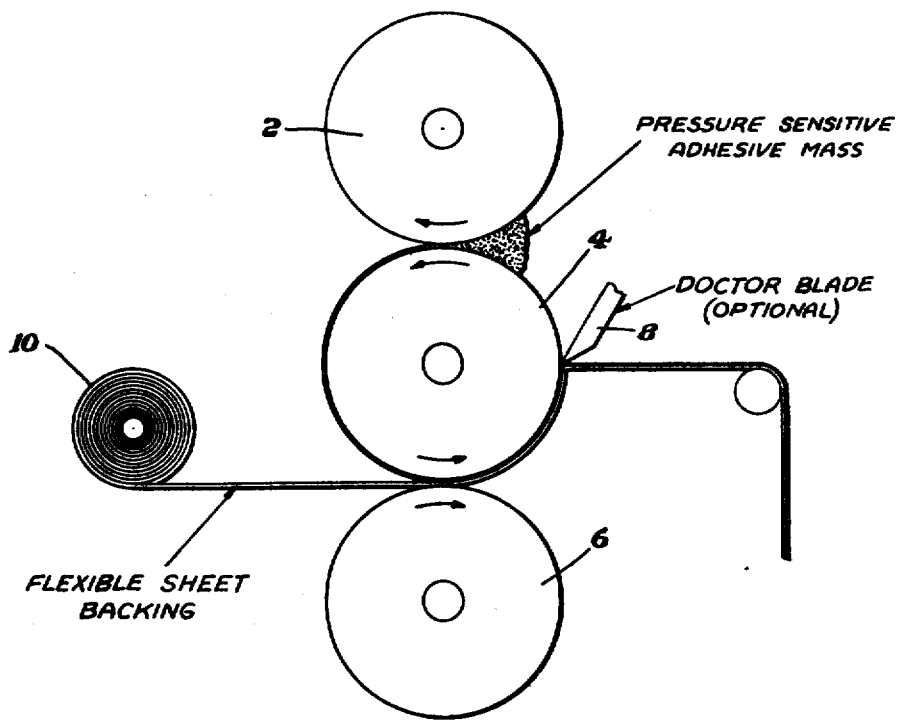
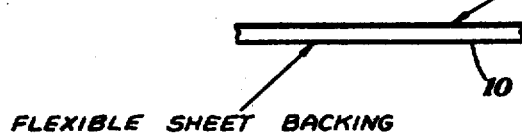

Patented Aug. 26, 1947

2,426,257

UNITED STATES PATENT OFFICE 2,426,257

PRESSURE SENSITIVE ADHESIVE AND ADHESIVE TAPE

Paul F. Ziegler, Winnetka, Ill., assignor to The Kendall Company, Boston, Mass., a corporation of Massachusetts Application August 2, 1940, Serial No. 349,973

1 Claim. (Cl. 154—53.5)

This invention relates to pressure-sensitive adhesive tapes and more particularly to the preparation of adhesives which may be utilized in the manufacture of pressure-sensitive adhesive tapes, and which may be, if desired, transparent.

A main object of the invention is the preparation of adhesives which, when applied to sheet backings, may have specific solvent resistance not found in present-day types of pressure-sensitive adhesives, and have better aging qualities. A further object of the invention is the preparation of adhesives which are of such chemical structure that they are useful with backings chosen without regard to the effect present-day commercial rubber or other types of water-insoluble adhesives would have upon the backing.

A further object of the invention is the preparation of adhesives which may be applied to desired backings without the use of volatile solvent spreading operations and yet which are not so thermoplastic as to be subject to material softening under the influence of normal atmospheric conditions encountered either in temperate or tropical climates, and will form tapes which may be preserved in usable condition in rolled form without the necessary use of slip sheeting.

To these ends the invention contemplates the preparation of adhesives in such manner as to permit their application to desirable sheet backing materials by calendering operations, preferably by the preparation of an adhesive mass of such tack and plasticity that it may be preformed into a plastic sheet of adhesive on a calender roll and thence transferred to the backing material, with or without the use of a doctor blade, heated or cold, associated with the calender roll. If a doctor blade is used, the combined adhesive sheet and plastic sheet may have imparted thereto a combined coextensive crepe.

The time honored water-insoluble type of pressure-sensitive adhesive has included as an essential ingredient rubber and generally rosin. By its nature rubber is not a good aging product, and, while substantial advances have been made in improving the aging quality of rubber-rosin pressure-sensitive adhesives, the continued presence of rubber cannot but militate against the life of the product especially under atmospheric conditions. It is therefore an object of this invention to provide adhesives wherein rubber is not an essential ingredient.

By the omission of rubber the transparency of the adhesive may also be improved inasmuch as almost all types of commercial rubber impart to some degree a yellowish hue, which, while it may not be noticeable in a single coating, is apparent when the coatings are superposed one upon another as in roll form when the sheet backing is also of a transparent material, such as regenerated cellulose.

Various examples of adhesives will hereinafter be described, although, broadly, this application relates to an adhesive mass which includes a resin, a non-volatile plasticizer for the resin and a film-forming vehicle for the resin and plasticizer, which vehicle is likewise suitably plasticized to provide structural supporting characteristics permitting the mass to be formed into a relatively thin coating having cohesive properties; or, to a mass which may include simply a liquid organic plasticizer and a film-forming vehicle in such proportions that the resulting mass will have qualities of tack known in the art as pressure-sensitive qualities.

As the film-forming ingredient for these adhesives, cellulosic vehicles may be utilized when suitably plasticized. Where a resin is used with the cellulosic vehicle, especially advantageous adhesives may be formed by utilizing a single plasticizer which is compatible both with the resin ingredient and with the cellulosic vehicle. Use of such a plasticizer presents opportunity for simple mixing and, when compounded in suitable proportions, gives highly uniform results due to the complete compatibility of the three ingredients.

While rosin is a time honored adhesive forming ingredient and may be utilized with certain cellulosic vehicles, other normally solid resins have a higher number of compatible plasticizers, and therefore are preferable.

As examples of suitable resins, the following may be mentioned:

Santolite resins (condensation products of formaldehyde with aromatic sulfonamides).
Phenolic resins, such as Rauzene and Ketone M.
Alkyd resins, such as Petrex.
Acrylic resins.

As the film-forming ingredient, I contemplate, as within the scope of this invention, the use of cellulose esters, such as cellulose acetate, cellulose butyrate and cellulose propionate, cellulose ethers, such as benzyl cellulose and ethyl cellulose, polyvinyl esters, such as polyvinyl acetate and polyvinyl chloride or mixtures thereof, and various types of chlorinated rubber, such as Plioform.

As plasticizers, the Santicizers (substituted phthalyl glycollates such as butyl phthalyl glycollate, methyl phthalyl ethyl glycollate and ethyl phthalyl ethyl glycollate) are especially efficacious with the cellulosic esters and with the polyvinyl esters, although liquid resinic plasticizers, such as Hercolyn (liquid hydrogenated methyl abietate) or other non-volatile plasticizers, such as dibutyl phthalate or chlorinated diphenyls, may be utilized.

These ingredients may be mixed, and brought to the proper consistency for spreading on flexible backings, for instance paper, or fabric, by a milling operation on a rubber mill, and may be transferred directly from the mill to the top of a three-roll calender. If desired, suitable solvents can be used in small proportions on the mill, for instance acetone, but the results in the final tape will be subject to the uncontrollable features arising from such technique.

The following are examples of suitable formulas, all figures being in parts by weight:

1

| | |
|---|---|
| Cellulose acetate (Type A-9), Tennessee Eastman Corp. 40-mesh) | 1 |
| Santolite M. H. P. (toluene sulfonamide formaldehyde resin) | 1-2 |
| Santicizer 8 (mixture of ortho and para toluene ethyl sulfonamides) | 2.5-5 |

2

| | |
|---|---|
| Granular benzyl cellulose | 1 |
| Rosin | 1.5 |
| Hercolyn (liquid hydrogenated methyl abietate) | 3 |

3

| | |
|---|---|
| Granular ethyl cellulose | 1 |
| Hydrogenated rosin | 1.5-2 |
| Hercolyn | 1-3 |

4

| | |
|---|---|
| Vinylite AYAF (polymerized vinyl acetate) | 5 |
| Rauzene N100 (100% phenolic resin) | 36 |
| Santicizer B16 (butyl phthalyl butyl glycollate) | 18 |

5

| | |
|---|---|
| Vinylite H (copolymer of vinyl acetate and vinyl chloride) | 4-20 |
| Santolite MS (tuloene sulfonamide formaldehyde resin) | 100 |
| Santicizer B16 | 40 |

6

| | |
|---|---|
| Vinylite A (polymerized vinyl acetate) | 40-100 |
| Santolite MS | 150 |
| Santicizer B16 | 60 |

7

| | |
|---|---|
| Cellulose acetate type A5 | 4-8 |
| Ketone M | 10 |
| Santicizer M17 (methyl phthalyl ethyl glycollate) | 18 |
| Acetone | 42 |

8

| | |
|---|---|
| Chlorinated rubber (Plioform) | 1 |
| Filler (rayox) titanium dioxide | 1 |
| Hercolyn | 1.5 |
| Zinc oxide | 1 |

As an example of proper milling operations in the case of the first formula, one part of cellulose acetate may be mixed with one part of Santicizer 8 and milled on a rubber mill at approximately 150° F. for 15 minutes. Two parts of Santolite are preferably melted in four parts of Santicizer 8 and gradually added to the plasticized cellulose acetate on the mill. The temperature can be maintained at 150° F. while the first two-thirds is being added, and then can be advantageously lowered to 120° F. for the remaining addition. This part of the mixing can be completed in about 1½ hours. In order to remove the mass from the mill, the fast roll should be cooled to say 90° F. and the slow roll heated to 150° F. The mass can then be removed by spading.

Such a mass may be transferred to a three-roll calender for spreading in a manner which will be described in connection with the accompanying drawings, in which, Fig. 1 is a diagrammatic representation of a three roll calender, and illustrating the spreading operation of one aspect of this invention; and Fig. 2 is a fragmentary showing of a tape resulting from the calendering operation illustrated in Fig. 1.

Thus, the adhesive mass previously described may be placed between the top and middle rolls 2 and 4, respectively, of the calender shown in Fig. 1, and by controlling the temperatures of the rolls so that the top roll 2 is at 150° F., the middle roll 4 at 95° F. and the bottom roll 6 at 135° F., such an adhesive may be extruded onto the middle roll in a thin preformed layer as shown, and may be pressure-united to a backing 10 fed between the bottom and middle rolls. The combined mass and backing can then be removed from the middle roll 4 by the use of a doctor blade 8, heated if desired to produce the tape illustrated in Fig. 2. Such operation insures the formation of an adhesive layer of substantially uniform thickness, as distinguished from solvent-laid coatings, wherein surface tensions during evaporation of the solvent greatly reduce uniformity of thickness. Furthermore, the tape comes from the calender with the adhesive substantially in condition for immediate use.

In the case of Formula 2, the benzyl cellulose may be first mixed into a solution of the Hercolyn and rosin and then masticated on the mill and subsequently calendered in manners similar to that set forth above.

Where the plasticizer used for the film-forming ingredient is a solid and compatible with but not a solvent for the resin, the adhesive may be prepared by preliminarily breaking down the plasticizer on a heated mill and then adding the film-forming ingredient, such as the cellulose acetate.

As can be understood, these techniques are such that the thermoplasticity of the adhesive need not be purposely reduced during formulation to such an extent as is required in preparing adhesives for hot-melt spreading operations, and low melting point ingredients, necessary for hot-melt spreading operations, can be omitted. As a result, the adhesives of this invention, after spreading, have resistance to heat superior to that of adhesives spread by hot-melt techniques, and therefore aid in providing a sheet material which may be safely rolled without the use of slip sheeting, and unrolled without delamination of the adhesive and backing.

The use of adhesive of the type above referred to opens up a vast field of backings which heretofore could not be used either because of the lack of adhesion of the rubber type adhesive to the backing or because of the high affinity of the rubber mass to the backing when the tape was wound upon itself, which prevented the tape from being unwound without leaving a residue of the mass upon the backing.

For instance, if a cellulosic or polyvinyl ester adhesive mass is used, various types of rubber-treated or rubber-coated fabrics or papers may be utilized for the backings. Likewise if it is desired to spread the cellulosic adhesives with a volatile solvent, the adhesive may be used on a backing which would be attacked by the usual types of rubber solvents. For instance with a cellulose acetate adhesive the following solvents may be used: ethyl acetate, acetone, benzyl alcohol.

For the polyvinyl esters, acetone may be utilized.

For benzyl cellulose adhesives, methyl cellulose acetate may be used.

The adhesives herein described may also be utilized as priming coats for pressure-sensitive adhesives.

Where an adhesive of less tack is desired, I have found that the cellulosic film-forming ingredients may be plasticized with resinous plasticizers, thereby avoiding the use of separate resinous and plasticizer ingredients. For instance, I have found that ethyl cellulose may be plasticized with compatible aromatic phosphates and then solvent spread by a common solvent for the plasticizer and cellulosic ingredient. For instance, I have utilized ethyl cellulose and di-(ortho-xenyl) mono-phenyl phosphate in the proportions of 10 parts of ethyl cellulose to 20 parts of the phosphate.

Such an adhesive may be solvent spread with a mixture of toluol and ethyl alcohol in the proportion of 4 to 1 by weight. Other substituted aromatic phosphates, such as di-(para-tertbutylphenyl) mono-phenyl phosphate in the same proportion to the ethyl cellulose or Stabilite ester No. 3 (hydrogenated glycerol abietate) may be utilized. The more plasticizer that is used, the tackier the resulting adhesive, but a range would be between 1.5 to 3 parts of plasticizer to 1 of film-forming vehicle.

While mention has been made of paper and fabric backings, it is to be understood that other well known types of backings may be utilized with these adhesives including non-fibrous transparent backings such as Cellophane, cellulose ester or cellulose ether sheet backings, or combinations thereof.

I claim:

An adhesive tape comprising a flexible sheet backing, having on one side thereof a pressure-sensitive adhesive, comprising a normally solid aromatic sulfonamide-formaldehyde resin, cellulose acetate and a non-volatile liquid toluene sulfonamide plasticizer compatible with both said resin and said cellulose acetal.

PAUL F. ZIEGLER.

REFERENCES CITED

The following references are of record in the file of this patent:

UNITED STATES PATENTS

| Number | Name | Date |
|---|---|---|
| 2,205,557 | Fischer | June 25, 1940 |
| 2,070,600 | Jenett | Feb. 16, 1937 |
| 1,953,901 | Ziegler | Apr. 3, 1934 |
| 2,201,908 | McBurney | May 21, 1940 |
| 2,170,416 | Klinger | Aug. 22, 1939 |
| 2,142,039 | Abrams | Dec. 27, 1938 |
| 2,236,766 | Schneider | Apr. 1, 1941 |
| 2,175,125 | Mack et al. | Oct. 3, 1939 |
| 2,214,007 | Ziegler et al. | Sept. 10, 1940 |
| 2,071,035 | Jenett | Feb. 16, 1937 |

FOREIGN PATENTS

| Number | Country | Date |
|---|---|---|
| 302,588 | Great Britain | Dec. 12, 1929 |

OTHER REFERENCES

Page 1075 of Technology of Cellulose Ethers, by Worden, published in 1933 by Worden Laboratory and Library, Millburn, New Jersey.

Certificate of Correction

Patent No. 2,426,257.

August 26, 1947.

PAUL F. ZIEGLER

It is hereby certified that error appears in the printed specification of the above numbered patent requiring correction as follows: Column 6, line 17, for the word "acetal" read *acetate*; and that the said Letters Patent should be read with this correction therein that the same may conform to the record of the case in the Patent Office.

Signed and sealed this 7th day of October, A. D. 1947.

[SEAL]

THOMAS F. MURPHY,
*Assistant Commissioner of Patents.* of adhesion of the rubber type adhesive to the backing or because of the high affinity of the rubber mass to the backing when the tape was wound upon itself, which prevented the tape from being unwound without leaving a residue of the mass upon the backing.

For instance, if a cellulosic or polyvinyl ester adhesive mass is used, various types of rubber-treated or rubber-coated fabrics or papers may be utilized for the backings. Likewise if it is desired to spread the cellulosic adhesives with a volatile solvent, the adhesive may be used on a backing which would be attacked by the usual types of rubber solvents. For instance with a cellulose acetate adhesive the following solvents may be used: ethyl acetate, acetone, benzyl alcohol.

For the polyvinyl esters, acetone may be utilized.

For benzyl cellulose adhesives, methyl cellulose acetate may be used.

The adhesives herein described may also be utilized as priming coats for pressure-sensitive adhesives.

Where an adhesive of less tack is desired, I have found that the cellulosic film-forming ingredients may be plasticized with resinous plasticizers, thereby avoiding the use of separate resinous and plasticizer ingredients. For instance, I have found that ethyl cellulose may be plasticized with compatible aromatic phosphates and then solvent spread by a common solvent for the plasticizer and cellulosic ingredient. For instance, I have utilized ethyl cellulose and di-(ortho-xenyl) mono-phenyl phosphate in the proportions of 10 parts of ethyl cellulose to 20 parts of the phosphate.

Such an adhesive may be solvent spread with a mixture of toluol and ethyl alcohol in the proportion of 4 to 1 by weight. Other substituted aromatic phosphates, such as di-(para-tertbutylphenyl) mono-phenyl phosphate in the same proportion to the ethyl cellulose or Stabilite ester No. 3 (hydrogenated glycerol abietate) may be utilized. The more plasticizer that is used, the tackier the resulting adhesive, but a range would be between 1.5 to 3 parts of plasticizer to 1 of film-forming vehicle.

While mention has been made of paper and fabric backings, it is to be understood that other well known types of backings may be utilized with these adhesives including non-fibrous transparent backings such as Cellophane, cellulose ester or cellulose ether sheet backings, or combinations thereof.

I claim:

An adhesive tape comprising a flexible sheet backing, having on one side thereof a pressure-sensitive adhesive, comprising a normally solid aromatic sulfonamide-formaldehyde resin, cellulose acetate and a non-volatile liquid toluene sulfonamide plasticizer compatible with both said resin and said cellulose acetal.

PAUL F. ZIEGLER.

REFERENCES CITED

The following references are of record in the file of this patent:

UNITED STATES PATENTS

| Number | Name | Date |
|---|---|---|
| 2,205,557 | Fischer | June 25, 1940 |
| 2,070,600 | Jenett | Feb. 16, 1937 |
| 1,953,901 | Ziegler | Apr. 3, 1934 |
| 2,201,908 | McBurney | May 21, 1940 |
| 2,170,416 | Klinger | Aug. 22, 1939 |
| 2,142,039 | Abrams | Dec. 27, 1938 |
| 2,236,766 | Schneider | Apr. 1, 1941 |
| 2,175,125 | Mack et al. | Oct. 3, 1939 |
| 2,214,007 | Ziegler et al. | Sept. 10, 1940 |
| 2,071,035 | Jenett | Feb. 16, 1937 |

FOREIGN PATENTS

| Number | Country | Date |
|---|---|---|
| 302,588 | Great Britain | Dec. 12, 1929 |

OTHER REFERENCES

Page 1075 of Technology of Cellulose Ethers, by Worden, published in 1933 by Worden Laboratory and Library, Millburn, New Jersey.

---

Certificate of Correction

Patent No. 2,426,257.                                August 26, 1947.

PAUL F. ZIEGLER

It is hereby certified that error appears in the printed specification of the above numbered patent requiring correction as follows: Column 6, line 17, for the word "acetal" read *acetate*; and that the said Letters Patent should be read with this correction therein that the same may conform to the record of the case in the Patent Office.

Signed and sealed this 7th day of October, A. D. 1947.

[SEAL]

THOMAS F. MURPHY,
*Assistant Commissioner of Patents.*